W. E. HARRISON.
COMBINED VARIABLE SPEED GEAR AND BRAKE MECHANISM FOR VELOCIPEDES.
APPLICATION FILED NOV. 5, 1917.
1,277,070.
Patented Aug. 27, 1918.
4 SHEETS—SHEET 1.
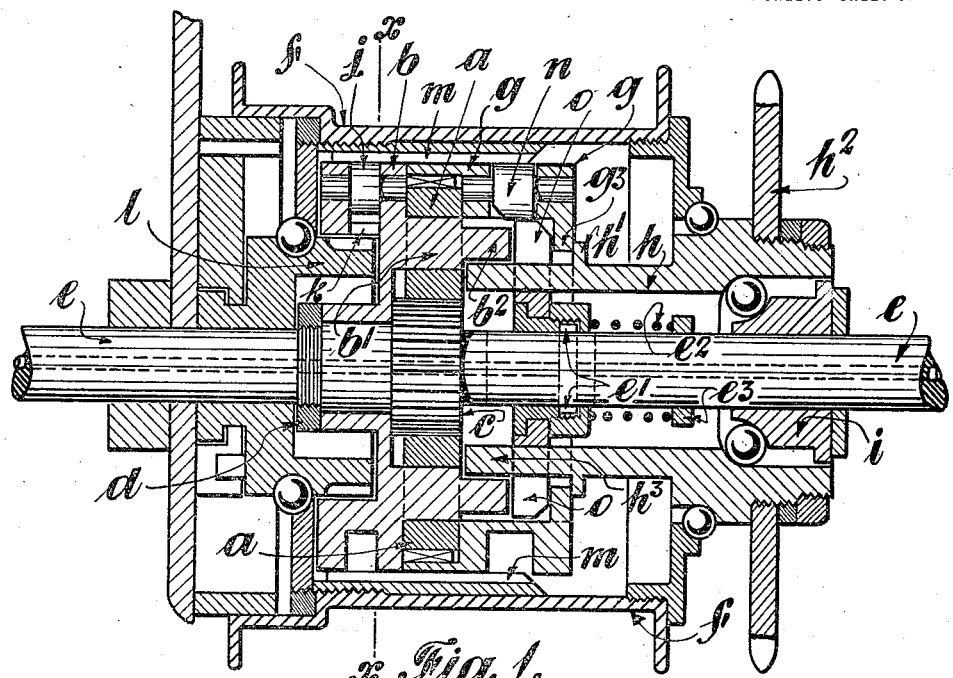
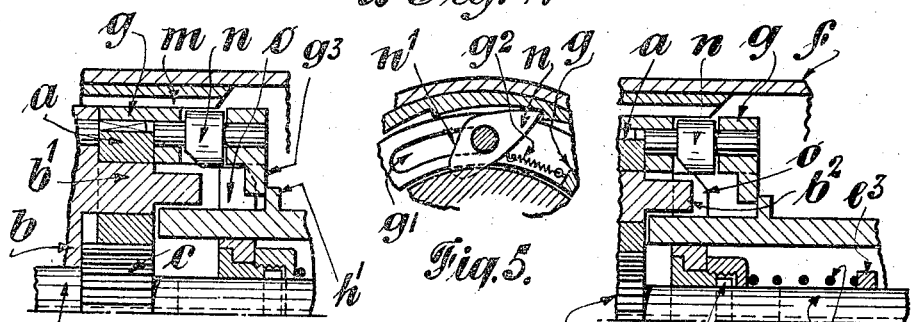
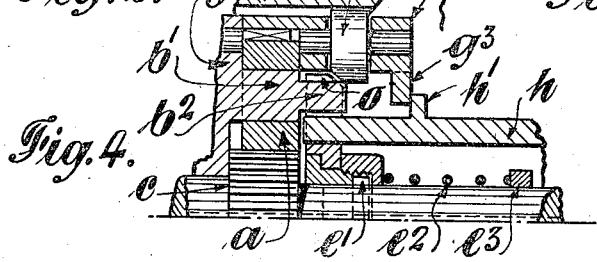
INVENTOR:-
William Edwin Harrison
BY HIS ATTORNEY:- Walter Gunn W. E. HARRISON.
COMBINED VARIABLE SPEED GEAR AND BRAKE MECHANISM FOR VELOCIPEDES.
APPLICATION FILED NOV. 5, 1917.

1,277,070.

Patented Aug. 27, 1918.
4 SHEETS—SHEET 3.

INVENTOR:—
William Edwin Harrison
BY HIS ATTORNEY:— Walter Guron

W. E. HARRISON.
COMBINED VARIABLE SPEED GEAR AND BRAKE MECHANISM FOR VELOCIPEDES.
APPLICATION FILED NOV. 5, 1917.

1,277,070.

Patented Aug. 27, 1918.
4 SHEETS—SHEET 4.

INVENTOR:—
William Edwin Harrison

BY HIS ATTORNEY:— Walter Gunn

UNITED STATES PATENT OFFICE.

WILLIAM EDWIN HARRISON, OF MANCHESTER, ENGLAND.

COMBINED VARIABLE-SPEED GEAR AND BRAKE MECHANISM FOR VELOCIPEDES.

1,277,070.  Specification of Letters Patent.  Patented Aug. 27, 1918.

Application filed November 5, 1917. Serial No. 200,325.

*To all whom it may concern:*

Be it known that I, WILLIAM EDWIN HARRISON, a subject of the King of Great Britain and Ireland, and resident of Manchester, England, have invented certain new and useful Improvements in Combined Variable-Speed Gear and Brake Mechanism for Velocipedes, of which the following is a specification.

This invention refers to combined epicyclic variable speed gear and back-pedaling brake mechanism for velocipedes of the kind in which three forward speeds, high, normal, low, can be obtained, in which the brake can be applied on all three speeds, and with which the velocipede can be wheeled backward without applying the brake. The main object of the present invention is a construction and combination of variable epicyclic speed gear and back-pedaling brake mechanism of the kind referred to in which there are comparatively few parts, while such parts are of a character which lend themselves to easy and systematic manufacture and afford great reliability in use.

The chief feature of the present invention is a combination of single epicyclic gear train, a back-pedaling brake, an arrangement of clutches, pawls and ratchet teeth, and a single driving member, all arranged within the velocipede wheel hub, the said gear train being either incapable of endwise movement, and one of the clutches being movable endwise, or the said gear train being bodily movable endwise; to effect the desired changes of speed. Further the said gear train and brake are combined so that on all speeds the brake is applied either through the low gear or the normal gear.

A further feature consists in arranging one or more pairs of the said pawls on the planet cage, one of each pair for driving the wheel hub forward on the low and normal speeds, and one for applying the brake, the said forward driving pawl of each pair being bodily movable relatively to the planet cage, and when driving the hub forward or when the velocipede is being wheeled backward, serving to hold the other pawl out of engagement with the brake.

Another feature consists in arranging one or more of the said pawls on the gear ring for driving the hub forward on the high speed, this last named pawl or pawls being yieldingly mounted on the gear ring and being adapted to be rendered inoperative for the low and normal speeds and when the brake is being applied, or when wheeling the velocipede backward.

The invention will now be described with the aid of the accompanying drawings, wherein:

Figure 1 illustrates one example of the improved three speed gear and brake mechanism applied to a velocipede wheel hub, the view being a longitudinal section through the hub, gear and brake mechanism.

Figs. 2, 3 and 4 illustrate alternative positions of the driving clutch member for giving the three speeds, Fig. 2 showing it in the position for giving the low speed.

Fig. 3 in the position for giving the normal speed, and

Fig. 4 in the position for giving the high speed.

Fig. 5 illustrates a detail hereinafter described.

Figs. 6, 7, 8, 9, 10 and 11 illustrate further detail parts hereinafter described.

Figure 12:
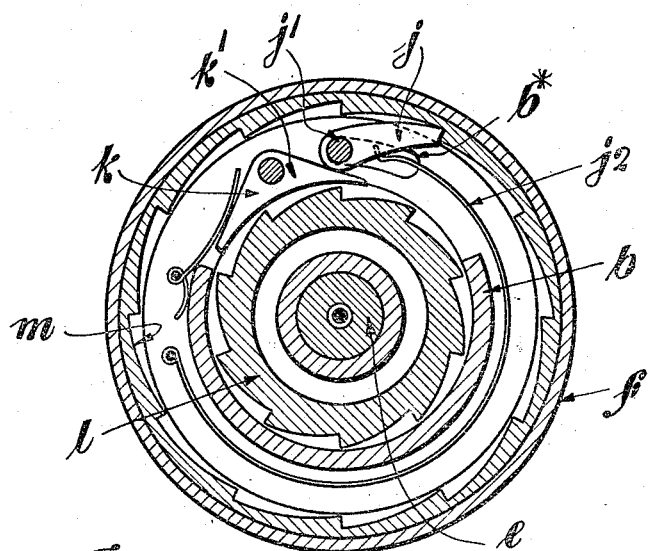
Figure 13:
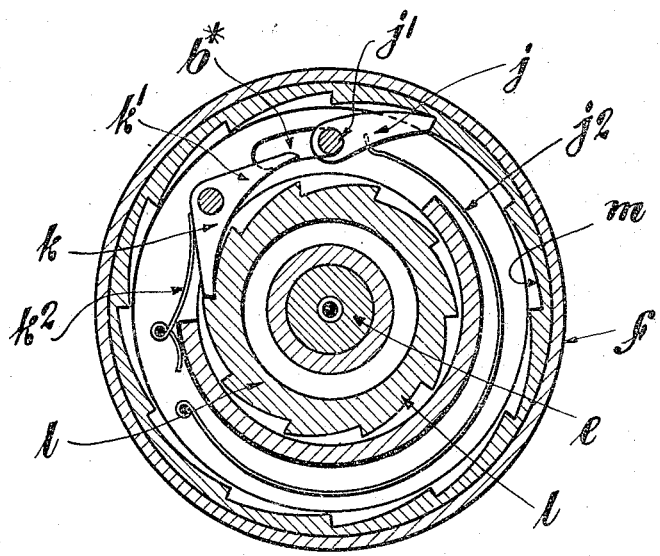

Fig. 12 illustrates a transverse section of Fig. 1 on line $x\ x$, and Fig. 13 a like section but showing the parts in an alternative position.

Figure 14:
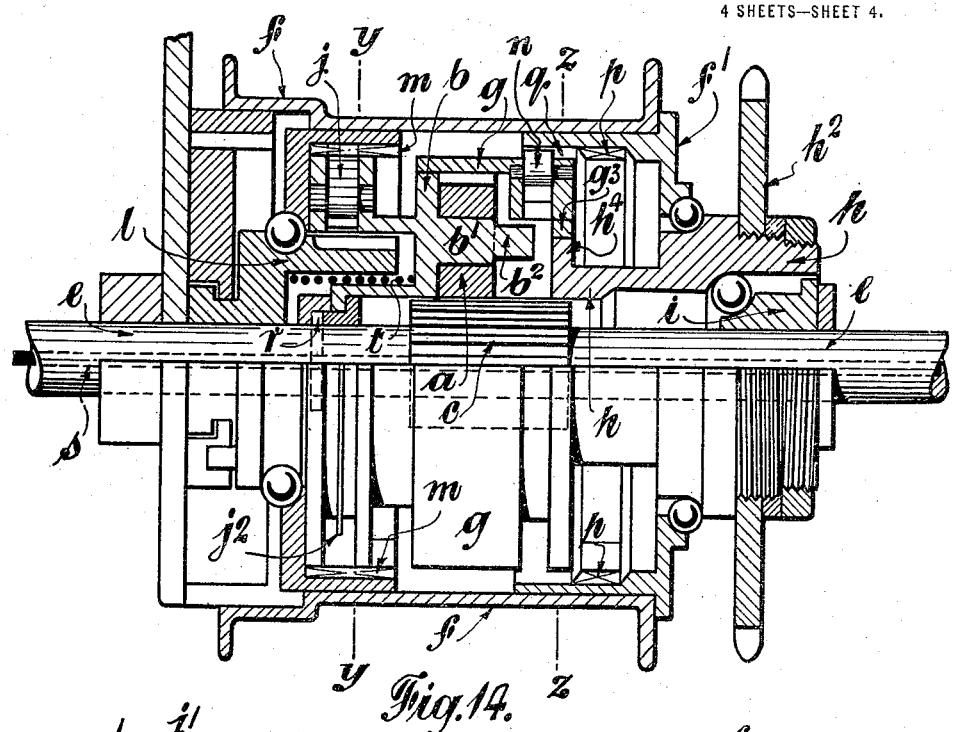
Figure 15:
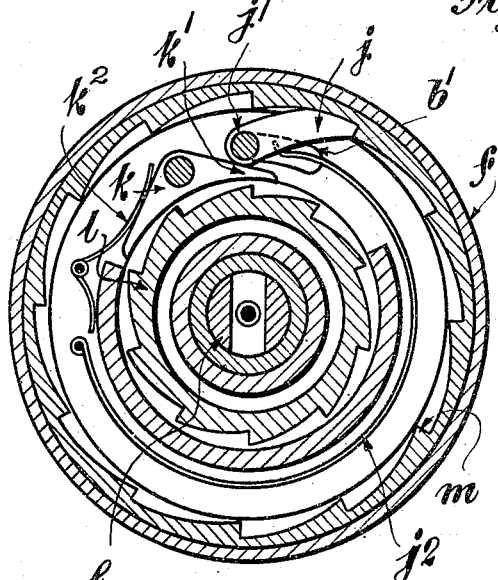
Figure 16:
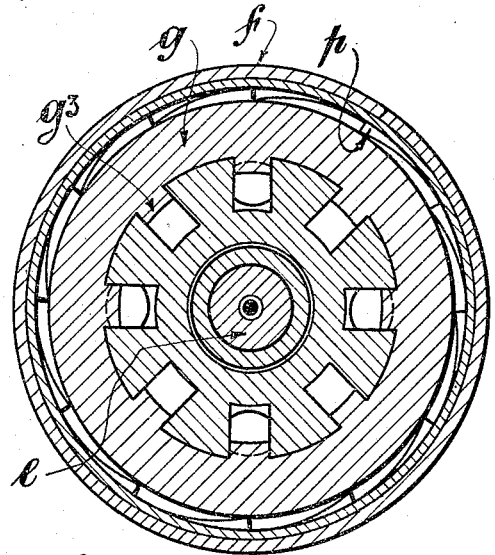

Fig. 14 illustrates another example of the improved three speed gear and brake mechanism applied to a velocipede wheel hub, the hub, gear and brake mechanism being partly in section. Fig. 15 illustrates a transverse section of the wheel hub and brake mechanism shown in Fig. 14 on line $y$—$y$, and Fig. 16 illustrates a transverse section of Fig. 14 on line $z$—$z$ looking toward the left hand end of the hub.

Referring to Figs. 1 to 13, the improved gear therein shown comprises a single train of planet pinions $a$, $a$ and a single planet pinion carrier or cage $b$, such cage being free to rotate but being held against endwise movement by the sun pinion $c$, and by a nut or collar $d$ screwing on to the relatively fixed axle $e$ of the velocipede wheel hub $f$. The improved gear also comprises an internally toothed gear ring $g$ meshing with the teeth of the planet pinions. Such gear ring, while free to rotate, is held against endwise movement by a flange $h'$ on the driving member $h$, which latter is carried on ball-bearings and is held against endwise movement by the usual ball race cone $i$ on the axle $e$.

In the planet cage $b$, which is recessed out, are mounted two pawls $j$, $k$, see Fig. 12.

The fulcrum studs $j'$ of the pawls $j$ project into the slots $b^*$ in the planet cage, and they, and the pawl, are capable of bodily movement along the slots, see Fig. 13. The fulcrum studs of the pawl $k$ are fulcrumed in holes, and the pawl is provided with an arm $k'$ adapted to be acted upon by pawl $j$ when the planet cage is being driven forward. The pawl $k$ lies near to ratchet teeth formed in the operating boss $l$ of a back-pedaling brake. This latter is preferably of the ordinary expanding type.

In the hub shell is formed or fitted a ring of ratchet teeth $m$, with which the pawl $j$ is adapted to engage for the purpose of driving the hub forward on the low and normal speeds.

A torsion spring $j^2$ secured at one end to the planet cage and at the other end to the pawl $j$, serves to urge the pivots of the pawl to one end of the slots $b^*$ and the free end of the pawl into engagement with the ratchet teeth $m$. A spring $k^2$ also secured to the planet cage at one part and pressing upon the pawl $k$ at another part serves to urge the pawl into engagement with the teeth of the boss $l$, when unrestrained by the pawl $j$.

Pivotally mounted in a through opening in the gear ring $g$ is a further pawl $n$. This pawl has a tail or arm $n'$ adapted, when unsupported, to project inward beyond the inner face of the gear ring and allow the pawl to engage the ratchet teeth $m$, see Fig. 5. The tail of the pawl is beveled on one side, see Fig. 1. The pivots of the pawl $n$, enter slots $g'$ in the gear ring, see Figs. 8 and 9, and under the influence of a spring $g^2$, the pawl pivots tend normally to bear against the end of the slot nearest the spring. The spring exerts its pull in a line slightly below the center of the pawl pivots so that when the tail $n'$ is free to move inward, the pawl is yieldingly forced outward and into engagement with the teeth $m$.

The chain sprocket wheel $h^2$ is mounted upon the driving member $h$, which latter, at its inner end, is formed with slots producing segmental jaws $h^3$, see Fig. 1. Slidably fitting the axle $e$ is a disk $o$, see Figs. 10 and 11, which is formed with slots $o'$ whereby it may engage the segmental jaws $h^3$ of the driving member $h$, the slots extending to the periphery of the disk. In said disk are also formed slots $o^2$.

Figure 8:
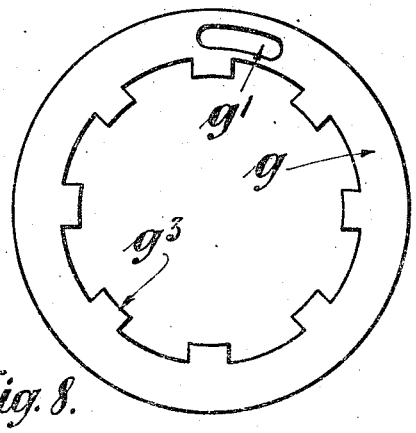
Figure 9:
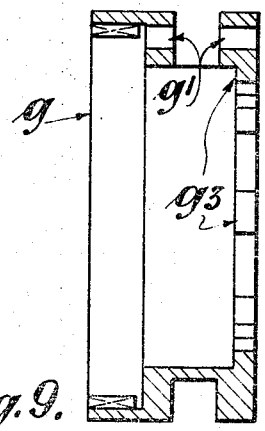
Figure 10:
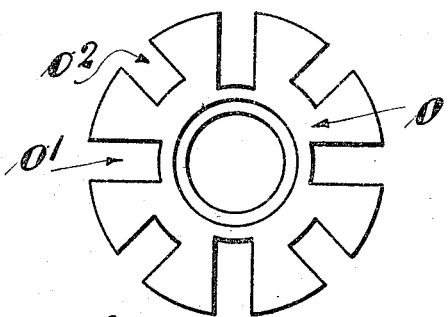
Figure 11:
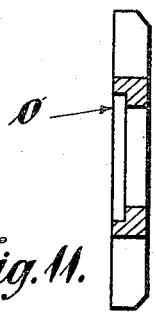

At one end the gear ring $g$ is formed with inwardly extending clutch teeth $g^3$, see Figs. 8 and 9, corresponding to the slots $o'$, $o^2$ of the disk $o$, and which are adapted to engage the slots when the disk is moved toward the right hand end of the hub.

Figure 6:
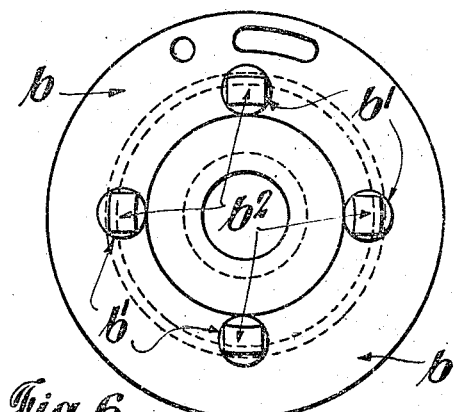
Figure 7:
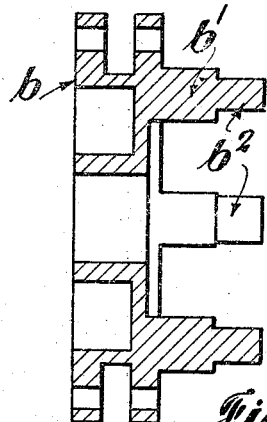

The axes $b'$ of the planet pinions are each formed with a projection $b^2$, see Figs. 6 and 7, corresponding to the segmental openings $o^2$ in the disk $o$. Upon its periphery and at one end the disk $o$ is beveled off. The disk $o$ is movable along the axle $e$ by means of a cross-pin $e'$, operated in one direction by a chain or cord, and in the reverse direction by a spring $e^2$, this latter abutting against a fixed flange $e^3$.

The action of the improved gear and brake mechanism is as follows: Starting with the disk $o$ in the neutral position as shown in Fig. 1, and requiring to obtain the low speed, the disk $o$ is moved to the position shown in Fig. 2, the drive then being transmitted through the gear ring $g$, planet pinions $a$, planet cage $b$ and pawl $j$, the pawl $n$ at such time being held out of engagement with the ratchet teeth $m$ by the plain part of the periphery of the disk $o$ preventing the tail end of the pawl $n$ moving inward. Upon requiring to obtain the normal speed, the disk $o$ is moved into engagement with the projections $b^2$ on the planet pinion axes, but not sufficiently far to allow the pawl $n$ to move inward, see Fig. 3, whereupon the drive is transmitted to the hub through the planet pinion axes $b'$ and pawl $j$, the pinions $a$ and gear ring $g$ rotating idly. To obtain the high speed, the disk $o$ is moved to the position shown in Fig. 4, thereby allowing the tail end of the pawl $n$ to move inward and the pawl outward and into engagement with the ratchet teeth $m$, the drive then taking place through the planet pinion axes $b'$, pinions $a$, gear ring $g$ and pawl $n$, the hub over-running the pawl $j$.

With the pivots of the pawl $n$ mounted in slots, and yieldingly held by the spring $g^2$, there is no jar when the pawl engages the teeth $m$. Similarly, the pawl $n$ readily leaves the teeth $m$ when changing down to the normal speed.

During the forward drive on the low and normal speeds, the pawl $k$ is held clear of the ratchet teeth of the boss $l$ by reason of the pawl $j$ pressing against the arm $k'$ but during the forward drive on the high speed (when the wheel hub overruns the planet cage), the pawl $j$ (owing to the spring $j^2$ moving it along the slots) allows the pawl $k$ to touch the teeth in the boss $l$, a slight clicking noise being produced as the pawl $k$ slips over the teeth.

To apply the brake, the motion of the driving member $h$, gear ring $g$ and planet cage $b$ is reversed, which results in the pawl $j$, under the influence of spring $j^2$, lagging behind until its trunnion studs reach the other end of the slots, when the pawl $k$ is free to engage the brake boss $l$ and rotate such boss through a portion of a revolution in a direction opposite to that of the motion of the hub $f$, see Fig. 13, whereupon the brake ring is expanded and the further forward motion of the hub arrested.

Owing to the pawl $k$ being on the planet cage, the brake can be applied on any speed. Further, owing to the pawl $n$ being rendered ineffective when the motion of the gear ring *g* is reversed, the brake is always applied either through the low gear, or through the normal gear.

On wheeling the machine backward by hand, the pawl *j* acting upon the arm *k'* holds the pawl *k* out of engagement with the ratchet teeth in the brake-operating boss *l*, and thus allows the machine to be wheeled backward to any desired extent without applying the brake.

When wheeling the machine backward on the high speed, the pawl *n*, owing to the slots *g*, has momentarily no effect on the gear ring, thereby allowing the pawl *j* to act upon the pawl *k* before the pawls *n* can affect the planet cage.

In Fig. 14 the planet cage *b*, gear ring *g* and pawls *j*, *k* are movable bodily along the hub axle, and in addition to the ratchet teeth *m*, there are ratchet teeth *p*, these latter being preferably formed in the end ring *f'* of the hub.

The planet cage is moved in one direction by a cross pin *r* and chain or cord *s*, and in the opposite direction by a spring *t*. The disk *o* described in connection with Figs. 1 to 13 is dispensed with.

The clutch teeth $g^3$ on the gear ring *g*, when the latter is moved endwise, directly engage like clutch teeth $h^4$ on the driving member *h*. Part of the ring *f'*, in which the ratchet teeth *p* are formed, is plain. The pawl *n* in this modification is formed without the tail part *n'*, Fig. 1, and is always free to move outward.

For the low speed the clutch teeth $g^3$ and $h^4$ engage each other and the drive takes place through the gear ring *g*, planet pinions *a*, planet cage *b* and pawl *j*. For the normal speed the planet cage and gear ring are moved endwise until the teeth $g^3$ come out of engagement with the teeth $h^4$ and the projections $b^2$ on the planet pinion axes engage the teeth $h^4$, the drive then taking place through the planet cage *b* and the pawl *j*. During the low and normal speeds the pawl *n* runs on the plain part of the ring *f'*. For the high speed the planet cage and gear ring are again moved endwise until the pawl *n* engages the ratchet teeth *p*, the ends of which are beveled, as also the side of the pawl, so that should the pawl fail to enter the spaces between the teeth it may ride up the ends of the teeth and eventually fall into engagement with the teeth. The pawl *n* in this arrangement is similarly mounted to the pawl *n* in Fig. 1.

The application of the brake, and the wheeling of the machine backward without applying the brake, are precisely the same in this last described arrangement as in the arrangement shown in Fig. 1.

Obviously there may be more than one pair of pawls *j*, *k* and more than one pawl *n*, but a single pair of pawls *j*, *k* and a single pawl *n* has been found satisfactory.

The pawl *j* in both arrangements always remains in engagement with the ratchet teeth *m*, and in Fig. 1 one set of ratchet teeth serve for both pawls *j* and *n*.

The planet cage *b*, gear ring *g* and disk *o* when formed as shown in Figs. 6 to 11 are easily produced and lend themselves to being made cheaply and accurately in quantities by automatic machinery. Moreover, when made they are easily assembled by unskilled labor. The minimum of material is also assured. The parts are also reliable in use, and are not easily put out of order by rough usage.

What I claim is:—

1. In combination, a velocipede wheel hub and a relatively fixed axle for said hub, a single epicyclic gear train and a back-pedaling brake within the hub, said gear train consisting of a fixed gear pinion, a single train of planet pinions, a planet cage and a a gear ring, means between the gear ring and wheel hub whereby the motion of the gear ring in one direction may be imparted to the hub, a driving member also within the hub, means whereby the said driving member may be caused to transmit its motion to the axes of the planet pinions through the gear ring, or direct, and also whereby the motion transmitting means between the gear ring and hub may be caused to be inoperative for the low and normal speeds, means for transmitting the forward motion of the planet cage to the wheel hub, or the reverse motion to the brake, the said forward motion transmitting means, between the planet cage and hub, operating automatically to disengage the brake operating means when the velocipede is being driven forward or wheeled backward, substantially as herein set forth.

2. In combination, a velocipede wheel hub, having ratchet teeth on its inner face, a relatively fixed axle for said hub, a fixed sun pinion on said axle, a single train of planet pinions, a planet cage for said pinions and a gear ring within the hub, the planet pinions meshing with the sun pinion and with the gear ring, and the axes of the planet pinions having clutch projections, a pair of pawls on the planet cage and a pawl on the gear ring respectively and one of the pawls on the planet cage being bodily movable relatively to the planet cage, and toward and away from the other pawl, and also being adapted to engage the ratchet teeth in the hub, for the low and normal speeds, the other pawl on the planet cage being reversed and having an arm with which the relatively movable pawl may engage when the hub is being driven forward or wheeled backward, the said third pawl on the gear ring being also adapted, for the high speed, to engage the ratchet teeth on the hub, a back-pedaling brake having an operating boss formed with ratchet teeth, with which the reversed pawl on the planet cage may engage when the cage is rotated backward, springs for urging the said pawls into engagement with the ratchet teeth and the bodily movable pawls toward one end of the slots in which their pivots lie, a driving clutch member at that end of the hub farthest from the brake, and means whereby the said driving clutch member may be caused to transmit its motion to the gear ring, or to the planet pinion axes, and the pawl on the gear ring may be caused to lie out of engagement with the ratchet teeth on the hub for the low and normal speeds, or be caused to engage such teeth for the high speed, substantially as herein set forth.

3. In combination, a velocipede wheel hub, having ratchet teeth on its inner face, a relatively fixed axle for said hub, a fixed sun pinion on said axle, a single train of planet pinions, a planet cage for said pinions, and a gear ring within the hub, the planet pinions meshing with the sun pinion and the gear ring, and the axes of the planet pinions having clutch projections and the gear ring having clutch teeth, a pair of pawls on the planet cage and one or more pawls on the gear ring, and one of the pawls on the planet cage being bodily movable relatively to the planet cage and toward and away from the other pawl, and also adapted always to engage the ratchet teeth in the hub, while the other pawl on the planet cage is reversed and has a rearwardly extending arm with which the bodily and relatively movable pawl may engage, the said farther pawl or pawls on the gear ring being yieldingly mounted on said gear ring and for the high speed being also adapted to engage the ratchet teeth on the hub, a back-pedaling brake with an operating boss having ratchet teeth, with which the reversed pawl on the planet cage may engage when the cage is rotated backward, springs for urging the said pawls into engagement with the ratchet teeth and the bodily movable pawls toward one end of the slots in which their pivots lie, a driving member having segmental jaws, a sliding disk with segmental slots constantly engaging the said jaws of the driving member and adapted to control the action of the pawl or pawls on the gear ring, and also adapted to be clutched to the gear ring, or to the projections on the planet pinion axes, substantially as herein set forth.

4. In combination, a velocipede wheel hub and a relatively fixed axle therefor, an epicyclic speed gear capable of giving three speeds, low, normal, high, within said hub, said gear consisting of a single train of planet pinions, a planet cage, a gear ring and a relatively fixed sun pinion, yieldingly mounted means between the gear ring and hub for transmitting the motion of the gear ring in one direction to the hub for the high speed, a driving member, and means for imparting the motion of said driving member to the planet pinion axes through the gear ring or direct, and also for causing the gear ring motion-transmitting devices to remain inoperative for the low and normal speeds, the said planet cage and pinion axes, which latter have clutch projections at their free ends, being formed solid and the planet cage being recessed, two pawls within the recess and said cage having holes and slots for the fulcrum studs of the pawls to project into, the pawl, the studs of which project into the slots being thereby free to move relatively to the planet cage in the direction of the slots, and the pawl, the studs of which enter holes, being arranged in the reverse direction to the other pawl and having a rearwardly extending arm upon which the relatively movable pawl may act when the planet cage is rotated forwardly, and back-pedaling brake mechanism, also within the velocipede wheel hub, comprising an operating boss having ratchet teeth in its periphery, with which the said pawl having the rearwardly extending arm may engage, except when restrained by the other pawl on the planet cage, substantially as herein set forth.

5. In combination, a velocipede wheel hub, and a relatively fixed axle therefor, an epicyclic speed gear capable of giving three speeds, low, normal, high, within said hub, said gear consisting of a single train of planet pinions, a planet cage, a relatively fixed sun pinion and a gear ring, a single ring of ratchet teeth on the interior of the wheel hub, a pawl on the planet cage for driving the hub forward on the low and normal speeds engaging said ratchet teeth, a further pawl yieldingly mounted on the gear ring capable of engaging the same ring of ratchet teeth for driving the hub forward on the high speed, such further pawl having a tail or arm capable of projecting inward beyond the inner face of the gear ring, a driving member having segmental jaws, a sliding disk with segmental slots engaging the jaws of the driving member, said gear ring having clutch teeth and the planet pinion axes having clutch projections with which the said disk may engage, and said disk having a beveled part and being adapted to cause the pawl on the gear ring to lie clear of the ratchet teeth in the hub, or allow them to engage the same, a further pawl on the planet cage, and a back-pedaling brake with operating boss having ratchet teeth, with which the last named pawl may engage, except when restrained by the other pawl on the planet cage, and springs for urging the said pawls into engagement with the ratchet teeth and the bodily movable pawls toward one end of the slots in which their pivots lie, substantially as herein set forth.

6. In combination, a velocipede wheel hub and a relatively fixed axle therefor, ratchet teeth in said hub, three speed epicyclic speed gear and back-pedaling brake mechanism within said hub, the said speed gear consisting of a single train of planet pinions, a planet cage, a relatively fixed sun pinion and a gear ring, and this latter having a through opening for the reception of a pawl, and also having inwardly extending clutch teeth, a pawl pivotally and yieldingly mounted in said through opening, and having a tail or arm adapted, when unsupported, to project inward beyond the inner face of the ring gear, further pawls on the planet cage for driving the hub forward and for applying the brake respectively, a driving member, and means between the driving member and the said gear ring whereby motion may be imparted to the planet cage, either through the gear ring or direct, and the said pawl on the gear ring prevented engaging the ratchet teeth in the hub for the low and normal speeds, or allowed to engage such teeth for the high speed, springs for urging the said pawl into engagement with the ratchet teeth and the bodily movable pawls toward one end of the slots in which its pivots lie, substantially as herein set forth.

7. In combination, a velocipede wheel hub and a relatively fixed axle therefor, ratchet teeth in said hub, three speed epicyclic speed gear and back-pedaling brake mechanism within said hub, the said speed gear consisting of a single train of planet pinions, a planet cage, a relatively fixed sun pinion and a gear ring, a pawl pivotally and yieldingly mounted on the ring gear, further pawls on the planet cage for driving the hub forward and for applying the brake respectively, a driving member, and means between the driving member and the said gear ring whereby motion may be imparted to the planet cage, either through the gear ring or direct, and means whereby the said pawl on the gear ring is prevented engaging the ratchet teeth in the hub for the low and normal speeds, or allowed to engage such teeth for the high speed, springs for urging the said pawls into engagement with the ratchet teeth and the bodily movable pawl toward one end of the slots in which its pivots lie, substantially as herein set forth.

In witness whereof I have hereunto set my hand in the presence of two witnesses.

WILLIAM EDWIN HARRISON.

Witnesses:
HENRY JUNCA,
FRED J. MEREDITH.

Copies of this patent may be obtained for five cents each, by addressing the "Commissioner of Patents, Washington, D. C."